Patented July 25, 1933

1,919,775

UNITED STATES PATENT OFFICE

RICHARD A. CRAWFORD AND FRANK K. SCHOENFELD, OF AKRON, OHIO, ASSIGNORS TO THE B. F. GOODRICH COMPANY, OF NEW YORK, N. Y., A CORPORATION OF NEW YORK

MANUFACTURE OF AQUEOUS DISPERSIONS

No Drawing.   Application filed April 22, 1929.   Serial No. 357,330.

This invention relates to the art of compounding latex; that is, of mixing pigments, fillers, etc. with rubber latex or similar aqueous dispersions of rubber or rubber-like bodies.

Certain insoluble salts or other compounds of polyvalent metals, such as lime, magnesia, calcium or magnesium carbonate, blanc fixe, litharge, etc. have proven to be valuable additions to rubber compositions, either as fillers or as accelerators of vulcanization. However, they are all somewhat soluble in water, and when they are added to latex they dissolve to an extent sufficient to diminish the stability of the latex or even to cause a complete coagulation thereof. Such materials will for convenience be hereinafter termed coagulating pigments. The object of this invention is therefore to provide a method of adding coagulating pigments to latex without appreciably affecting its stability.

This invention consists in coating the particles of coagulating pigments with a substance which is impermeable to water. Examples of such substances are paraffin, beeswax, bitumen, etc., which are preferably applied by dissolving them in a volatile solvent, mixing the solution with the pigment, and allowing the solvent to evaporate. The pigment particles, when coated in this manner, tend to stick together in a cake, but the cake is readily broken up and dispersed in water by the usual methods, such as passing through a colloid mill in the presence of protective colloids or dispersing agents. Such water dispersions may then be freely mixed with latex without fear of coagulation. If, instead of latex, it is desired to mix an artificial dispersion of rubber or like substance with a coagulating pigment, the pigment may be coated in the manner described above and dispersed simultaneously with the rubber.

*Example 1.*—As a specific example of one embodiment of this invention, 100 parts by weight of hydrated lime are mixed with a benzol solution containing 10 parts of beeswax. The benzol is allowed to evaporate and the dried mass is broken up into small fragments. 1 part of gelatine, 1 part of ammonium oleate and ½ part of concentrated ammonia are dissolved in 500 parts of water. The gelatine functions as a typical protective colloid and the ammonium oleate as an emulsifying agent. The coated lime is stirred in and the mixture is passed through a colloid mill, which effects a fine dispersion on the particles of lime, without disrupting the film of beeswax surrounding the individual particles. The dispersion may be mixed with latex in any proportions without appreciably affecting its stability. A similar dispersion of lime which is not coated with beeswax coagulates latex almost instantly.

*Example 2.*—100 parts by weight of litharge are coated with paraffin by mixing the litharge with a gasoline solution of 10 parts of paraffin and allowing the gasoline to evaporate. A rubber dispersion is prepared by masticating 200 parts of rubber with 12 parts of potassium oleate. A 15% solution of ammonia is slowly mixed into the plastic rubber mass until the so-called "inversion" of the phases takes place, that is, until the mixture ceases to be a dispersion of fine particles of water in a mass of rubber and becomes a dispersion of fine particles of rubber in an aqueous medium. At this point the mixture has a characteristic soft and stringy consistency. The coated litharge is slowly added and thoroughly mixed with the rubber, and the dispersion is diluted with alkaline water to the desired concentration. Uncoated litharge added to the rubber dispersion would cause serious agglomeration and the formation of visible lumps.

It is evident that the method of this invention permits the addition of coagulating pigments to latex or other sensitive dispersions without affecting their stability or causing coagulation. Although it has been found exceedingly useful in connection with rubber dispersions, this invention may be employed in other cases in which it is desired to mix a slightly soluble compound of a polyvalent metal with a coagulable dispersion.

The coating of the impermeable material may be applied to the pigment otherwise than by mixing the pigment with a solution thereof. For example, the coating material may be melted and the pigment stirred into the liquid mass. A somewhat large quantity may be necessary to coat the pigment particles completely by this modification of the invention.

While we have herein disclosed with considerable particularity certain preferred manners of performing our invention, we do not thereby desire or intend to limit ourselves solely thereto, for, as hitherto stated, the precise proportions of the materials utilized may be varied and other materials having equivalent chemical properties may be employed if desired without departing from the spirit and scope of the invention as defined in the appended claims.

We claim:

1. The method of dispersing slightly water soluble pigments in water which comprises coating the pigment particles with a substance which is impermeable to water, and dispersing the coated particles in water.

2. The method of dispersing slightly water soluble pigments in water which comprises coating the pigment particles with a solid waxy substance which is impermeable to water, and dispersing the coated particles in water.

3. The method of dispersing slightly water soluble pigments in water which comprises admixing the pigment with a solution of a wax in a volatile organic solvent, allowing the solvent to evaporate, and dispersing the coated particles in water.

4. The method of dispersing slightly water soluble pigments in water which comprises coating the pigment particles with a solution of beeswax in a volatile organic solvent, allowing the solvent to evaporate, and dispersing the coated particles in water.

5. The method of dispersing slightly water soluble compounds of polyvalent metals in water which comprises coating the particles of the metal compounds with a wax, and dispersing the coated particles in an alkaline aqueous medium.

6. The method of dispersing slightly water soluble inorganic bases in water, which comprises coating the particles thereof with a solution of beeswax in a volatile solvent therefor, allowing the solvent to evaporate, and dispersing the coated particles in an alkaline aqueous medium containing a protective colloid.

7. The method of admixing coagulating pigments with rubber emulsions which comprises coating the pigment particles with a substance which is impermeable to water, and dispersing the coated particles in conjunction with a rubber dispersion.

8. The method of admixing coagulating pigments with alkaline rubber emulsions which comprises coating the pigment particles with a solid waxy substance which is impermeable to water, and adding the coated particles to rubber which is in the process of dispersion.

9. The method of admixing coagulating pigments with alkaline rubber emulsions which comprises coating the pigment particles with a solution of beeswax in a volatile organic solvent, allowing the solvent to evaporate, and adding the coated particles to rubber which is in the process of dispersion.

10. The method of admixing slightly water soluble inorganic bases with rubber emulsions which comprises coating the particles of said bases with a wax, and adding the coated particles to rubber which is in the process of dispersion.

11. Aqueous dispersions of slightly water soluble pigments in which the pigment particles are coated with a substance which is impermeable to water.

12. Aqueous dispersions of slightly water soluble pigments in which the individual pigment particles are coated with a solid waxy substance which is impermeable to water.

13. Aqueous dispersions of slightly water soluble compounds of polyvalent metals in which the particles of the metal compound are coated with a wax.

14. Aqueous dispersions of slightly water soluble inorganic bases in which the particles of the base are coated with beeswax.

15. Stable aqueous emulsions comprising discrete particles of rubber and of a slightly water soluble pigment, the particles of the said pigment being coated with a substance which is impermeable to water.

16. Stable aqueous emulsions comprising discrete particles of rubber and of a slightly water soluble pigment, the particles of the said pigment being coated with a solid, waxy substance which is impermeable to water.

17. Stable alkaline aqueous emulsions comprising discrete particles of rubber and of a slightly water soluble inorganic base, the particles of the base being coated with a wax.

RICHARD A. CRAWFORD.
FRANK K. SCHOENFELD.